US009469322B2

(12) United States Patent
Du Toit

(10) Patent No.: US 9,469,322 B2
(45) Date of Patent: Oct. 18, 2016

(54) SELF-PROPELLED GOLF VEHICLE

(76) Inventor: Arnold Du Toit, London (GB)

(*) Notice: Subject to any disclaimer, the term of this patent is extended or adjusted under 35 U.S.C. 154(b) by 270 days.

(21) Appl. No.: 13/989,892

(22) PCT Filed: Nov. 25, 2011

(86) PCT No.: PCT/EP2011/071085
§ 371 (c)(1),
(2), (4) Date: Jan. 6, 2014

(87) PCT Pub. No.: WO2012/069565
PCT Pub. Date: May 31, 2012

(65) Prior Publication Data
US 2014/0125021 A1    May 8, 2014

(30) Foreign Application Priority Data

Nov. 25, 2010 (GB) .................................. 1020034.3
Nov. 26, 2010 (GB) .................................. 1020104.4

(51) Int. Cl.
| | |
|---|---|
| *B62B 3/02* | (2006.01) |
| *B62B 3/10* | (2006.01) |
| *B62B 5/00* | (2006.01) |
| *B62B 5/08* | (2006.01) |
| *B62D 51/02* | (2006.01) |

(Continued)

(52) U.S. Cl.
CPC ................ *B62B 3/10* (2013.01); *A63B 55/61* (2015.10); *B62B 3/02* (2013.01); *B62B 5/0033* (2013.01); *B62B 5/087* (2013.01); *B62D 51/02* (2013.01); *A63B 2208/0204* (2013.01); *A63B 2210/50* (2013.01); *B62B 2202/404* (2013.01); *B62B 2205/00* (2013.01); *B62B 2206/006* (2013.01); *B62D 51/008* (2013.01); *B62D 51/04* (2013.01)

(58) Field of Classification Search
CPC ......... A63B 55/087; B62B 3/00; B62B 3/10; B62B 3/102; B62B 3/02; B62B 3/022; B62B 5/0033; B62B 5/04; B62B 5/067; B62B 5/087; B62D 1/12; B62D 51/02; B62D 51/04
See application file for complete search history.

(56) References Cited

U.S. PATENT DOCUMENTS

| | | | | |
|---|---|---|---|---|
| 4,354,569 | A | * | 10/1982 | Eichholz ..................... 180/211 |
| 4,848,504 | A | * | 7/1989 | Olson ......................... 180/19.1 |
| 5,647,601 | A | * | 7/1997 | Potter et al. ............... 280/47.38 |

(Continued)

FOREIGN PATENT DOCUMENTS

| | | |
|---|---|---|
| DE | 10240846 | 3/2004 |
| DE | 102006057156 A1 * | 6/2007 |

(Continued)

OTHER PUBLICATIONS

International Search Report for corresponding International Application No. PCT/EP2011/071085, mailed Apr. 5, 2012.

(Continued)

*Primary Examiner* — Paul N Dickson
*Assistant Examiner* — Steve Clemmons
(74) *Attorney, Agent, or Firm* — Jason H. Vick; Sheridan Ross, PC

(57) ABSTRACT

A self-propelled vehicle (10) suitable for use as a golfing accessory, the vehicle comprising: a plurality of wheels (14, 21), a base part (12) and a control arm (18), wherein the control arm and base part are moveable relative to one another so that said vehicle can be arranged in one of a plurality of different operating configurations.

10 Claims, 15 Drawing Sheets

(51) Int. Cl.
*B62D 51/00* (2006.01)
*B62D 51/04* (2006.01)

(56) References Cited

U.S. PATENT DOCUMENTS

| | | | |
|---|---|---|---|
| 6,390,216 B1 * | 5/2002 | Sueshige et al. | 180/65.51 |
| 6,402,186 B1 * | 6/2002 | Garland | 280/647 |
| 6,474,427 B1 * | 11/2002 | Tunnecliff | 180/19.1 |
| 6,581,945 B1 * | 6/2003 | Shapiro | 280/30 |
| 6,715,785 B2 * | 4/2004 | Shieh | 280/651 |
| 6,863,297 B2 * | 3/2005 | Shapiro | 280/646 |
| 7,000,939 B2 * | 2/2006 | Shapiro | 280/646 |
| 2008/0196951 A1* | 8/2008 | Gal et al. | 180/65.1 |
| 2012/0118657 A1* | 5/2012 | Liao | 180/208 |

FOREIGN PATENT DOCUMENTS

| | | |
|---|---|---|
| DE | 202010010068 | 9/2010 |
| DE | 202012002204 U1 * | 6/2012 |
| GB | 2306925 A * | 5/1997 |
| GB | 2478940 A * | 9/2011 |
| WO | WO 2007/013084 | 2/2007 |
| WO | WO 2010091460 A1 * | 8/2010 |

OTHER PUBLICATIONS

Written Opinion for corresponding International Application No. PCT/EP2011/071085, mailed Apr. 5, 2012.

* cited by examiner

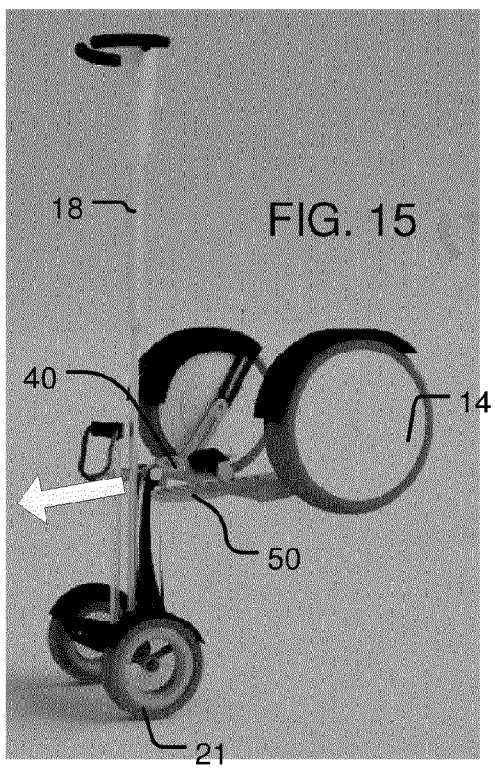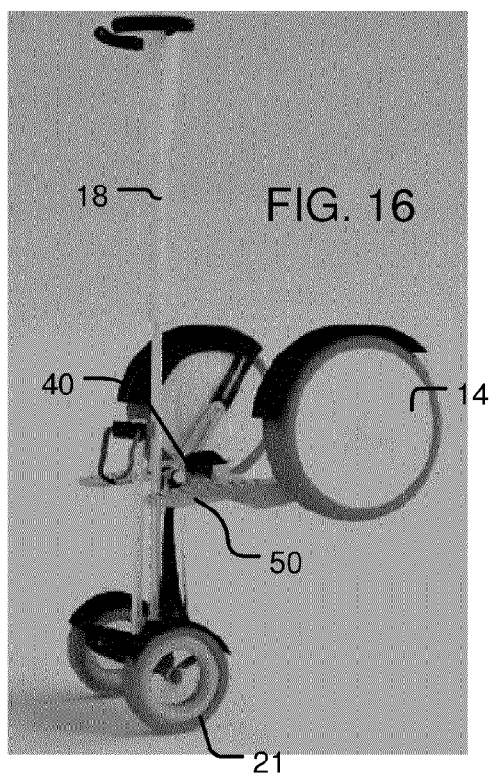

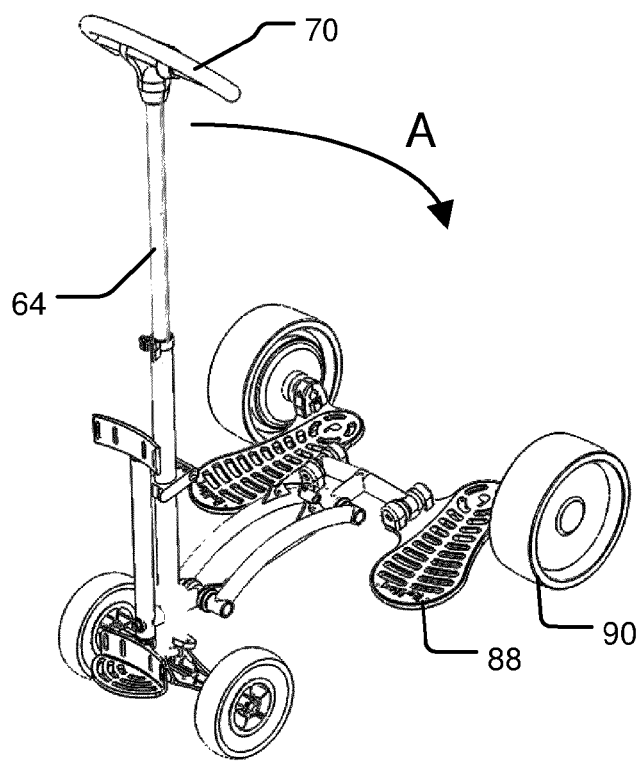
FIG. 19
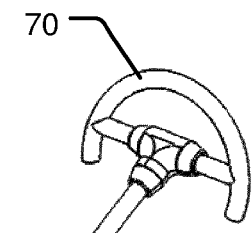
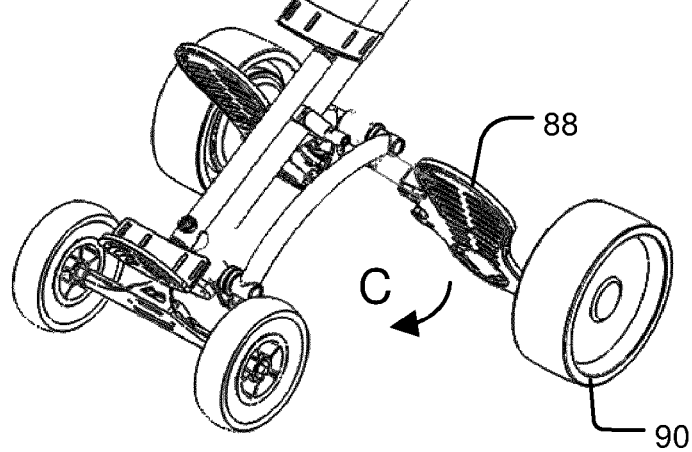
FIG. 20

SELF-PROPELLED GOLF VEHICLE

CROSS REFERENCE TO RELATED APPLICATIONS

This application is a national stage application under 35 U.S.C. 371 of PCT Application No. PCT/EP2011/071085 having an international filing date of 25 Nov. 2011, which designated the United States, which PCT application claimed the benefit of Great Britain Application No. 1020034.3 filed 25 Nov. 2010 and Great Britain Application No. 1020104.4 filed 26 Nov. 2010, each of which are incorporated herein by reference in their entirety.

FIELD

This invention relates to self-propelled vehicles. In one illustrative embodiment the vehicle is configured as a self-propelled golfing accessory, but it will be understood that embodiment is merely illustrative of one application of the teachings of the present invention and hence should not be interpreted as being a limitation of the scope of the present invention.

BACKGROUND

Whilst it has previously been said that the game of golf is a terrible way to ruin a good walk, it remains the case that golf is an extremely popular leisure activity.

Golf is a particularly popular pastime for those persons of advancing years—in the first instance because they tend to have the time available to devote to the game, and in the second instance because it affords an opportunity for those players to partake in reasonably gentle exercise as they walk around the golf course.

However, one problem is that whilst most of these players can manage to walk round a golf course, a significant proportion of them find it very difficult to walk round the course whilst carrying a golf bag (containing golf clubs). Irrespective of whether or not they are carrying a golf bag, it is also the case that as these players go round the course they tend to tire, and as they do so they become less able to play the game to their full ability—in effect, their game suffers as the round progresses.

To address these problems it has previously been proposed to provide players with golfing trolleys that can carry a golf bag and a set of golf clubs, and which a player can take with them round the course (thereby removing the need for the player to manhandle their golf clubs round the course). Some trolleys are configured to be dragged or pushed round the course by the golfer, and others include a motor so that the trolley can propel itself around the course. Illustrative examples of self-propelled trolleys are those offered for sale by PowaKaddy International Limited and Hill Billy (both of whom have a place of business at Castle Road, Sittingbourne, Kent, ME10 3RN, UK).

Whilst it is true that trolleys do provide the player with an effective means for avoiding having to manhandle a set of clubs round the course, they do not provide assistance to those golfers who tend to tire as they go round the course with attendant adverse repercussions for their game.

For these golfers, who are typically but not always of advancing years, there are precious few options available. One option is the traditional golf cart (otherwise known as the golf buggy or golf car), examples of which are available from the Yamaha Golf-Car Company (a company having a place of business at: 1000 Georgia Highway 34 East, Newnan, Ga. 30265, United States of America), but by availing themselves of this option the golfer loses much of the ability to take exercise—which is highly undesirable given that taking exercise is a key driver for playing the game in the first place.

Another currently available option is the X2 Golf available from Segway Inc. 14 Technology Drive, Bedford, N.H. 03110, United States of America (for further details, specifications and images see: http://www.segway.com/individual/models/x2-golf.php). The X2 Golf is essentially a standard Segway personal transportation device that has been modified to include wider tyres (to reduce damage to the golfing surface) and a carrier for supporting a golf bag. Whilst this device provides an effective means for players to get around a golf course, it suffers from several disadvantages.

Firstly, it is a relatively expensive option (at least in comparison to a motorised golf trolley). Secondly, a player making use of the X2 Golf would—in a similar manner to golf carts—avoid much of the exercise that they would have got were they to have walked round the golf course. Thirdly, the X2 Golf weighs some 50 kg, and as such it would probably need two persons to lift it. Finally, the X2 golf is relatively large and would therefore take up quite a lot of space in a vehicle (especially if the vehicle also has to transport a golf bag, clubs and a set of ramps that allow the user to more easily load their Segway into a vehicle), and hence not be suitable for many commonly available vehicles.

It is apparent from the foregoing that there is a need in the art for a device that supports those players who wish to take some exercise whilst playing, whilst releasing those players from having to manhandle their clubs round the course. The present invention has been devised with these needs in mind.

SUMMARY

In accordance with a presently preferred embodiment of the present invention, there is provided a self-propelled vehicle suitable for use as a golfing accessory, the vehicle comprising: a plurality of wheels, a base part and a control arm, wherein the control arm and base part are moveable relative to one another so that said vehicle can be arranged in one of a plurality of different operating configurations.

In a first of said operating configurations the vehicle is configured to allow a user to ride on the vehicle. Furthermore, in a second of said operating configurations the vehicle is configured for use as a trolley, in particular a trolley for supporting a golf bag. Also, the base part and control arm may be moved relative to one another to place the vehicle in a storage configuration whereby the vehicle is collapsed for compact storage.

The base part may comprise first and second base part members which are pivotally coupled to one another. In particular, such first and second base part members may be configured to be generally linearly aligned when the vehicle is in the first configuration. Furthermore, such first and second base part members may be configured to be generally perpendicular to one another when the vehicle is in the second configuration.

A base part member may have a pair of wheels coupled thereto. The wheels of said pair may be configured to be pivoted relative to the base part component to which they are coupled. Furthermore, the wheels of said pair may be configured to be moved between a first position in which the wheels are generally axially aligned with one another, and a second position in which the wheels are out of axial alignment with one another.

In addition (or instead) the wheels of said pair may be configured to be moved translationally relative to the base part member to which they are coupled. This allows such wheels to be moved into a position where they do not engage the floor when the vehicle (held in an upright position as in FIGS. 15 and 16) is moved between the second configuration and storage configuration (see FIG. 9—which shows the vehicle partially configured in the storage configuration). In particular, such translational movement of said wheels allows the wheels to be held above the ground when the vehicle is in an upright position (see FIG. 9) such that the vehicle to be transported on the other wheels in a similar manner to a travel suitcase for example.

The vehicle may also comprise a motor for driving one or more of the wheels coupled to the vehicle. Such a motor may be configured to drive one or more rear wheels of the vehicle. More specifically, such a motor may comprise an electric motor.

According to another aspect of the present invention there is provided a reconfigurable self-propelled golfing accessory configurable as a ride-on trike, quad or golf trolley. Furthermore, according to a further aspect of the present invention there is provided any combination of features herein described.

Other features, advantages and aspects of the present invention are set out in and will become apparent from the following detailed description of a presently preferred embodiment.

BRIEF DESCRIPTION OF THE DRAWINGS

The teachings of the present invention, and arrangements embodying those teachings, will hereafter be described by way of illustrative example with reference to the accompanying drawings, in which:

FIG. 15 is a perspective view of a vehicle in the aforementioned second position prior to moving the rear wheels translationally along the first base part member;

FIG. 16 is a perspective view of the vehicle in FIG. 16 after having the rear wheels have been moved translationally along the first base part member;

FIGS. 19 and 20 are schematic representations of the vehicle as it is moved from the aforementioned first configuration to a second configuration;

DETAILED DESCRIPTION

Aspects of the present invention will now be described with particular reference to a self-propelled vehicle that is used as a golfing accessory. It should be remembered, however, that this description is merely illustrative of the teachings of the present invention and that the vehicle may have many other applications (for example, the vehicle may be used as a general mobility aid), and as such the following description should not be interpreted as being a limitation of the scope of the present invention.

With the above proviso in mind, reference will now be made to FIGS. 1 to 4 and 6 to 12 in which there are depicted perspective views of a self-propelled vehicle 10 in various configurations.

Figure 1:
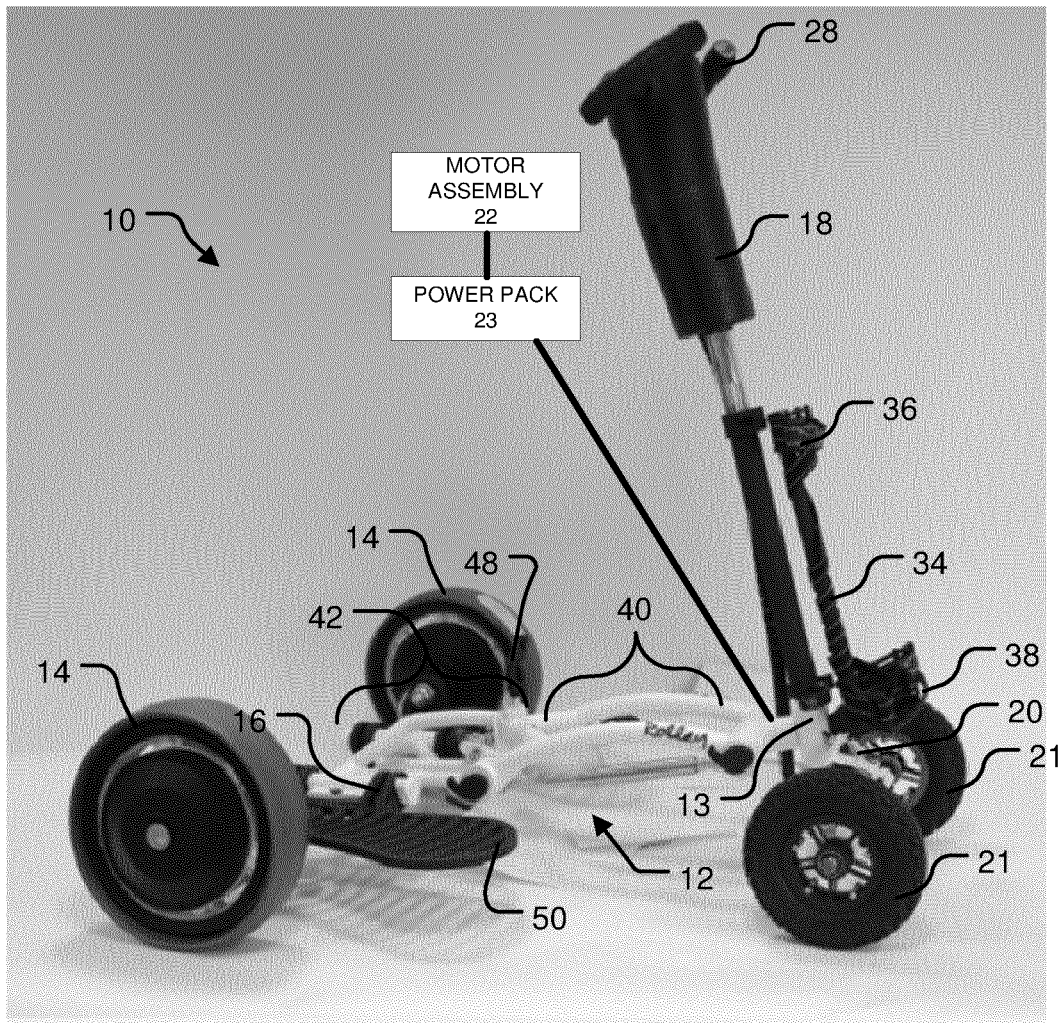
FIG. 1 is a side perspective view of a vehicle in a first operating configuration.

With particular reference to FIG. 1 the vehicle 10 comprises a base part 12 to which a pair of rear wheels 14 are coupled via rear connectors 16. Such wheels 14 may be removable from the rear connectors 16, and in one embodiment are coupled thereto by means of quick release couplings so that they can be removed to reduce the size of the vehicle 10 for storage.

The vehicle 10 also has a control arm 18 which is coupled to a front connector 20, the front connector being able to be rotated relative to the base part 12. More specifically, the front connector 20 is rotatably coupled to a pivot connector 13, the pivot connector being pivotally coupled to the base part 12 (also see FIG. 8). Furthermore, the front connector 20 is (optionally removably) coupled to a pair of front wheels 21 (or alternatively a single front wheel).

Figure 5:
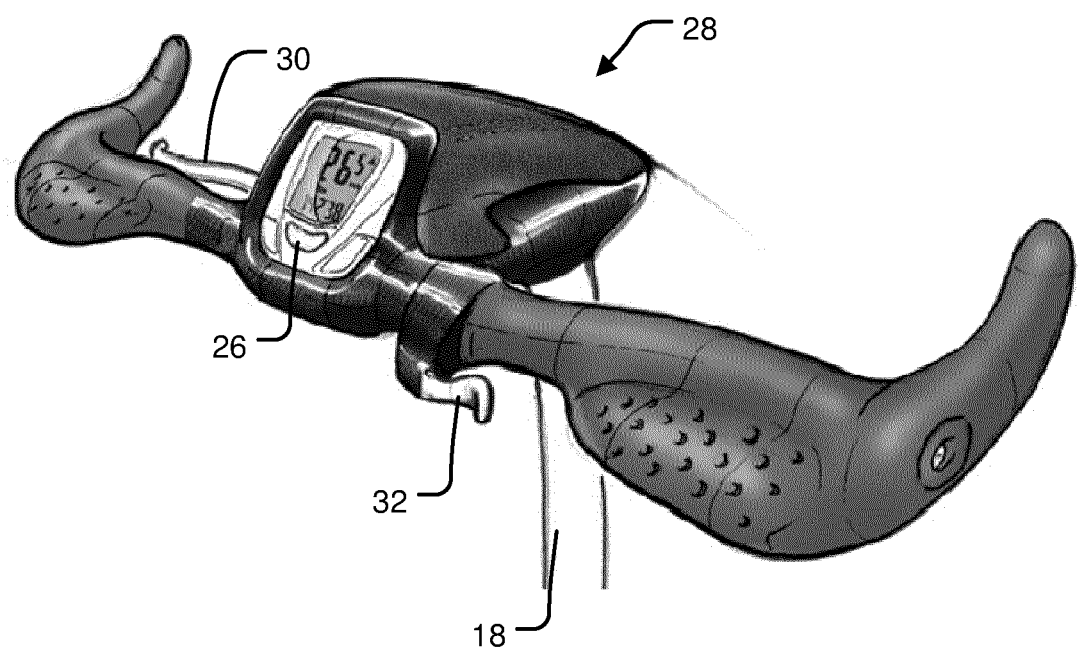
FIG. 5 is a perspective view of a handle bar arrangement.
Figure 13:
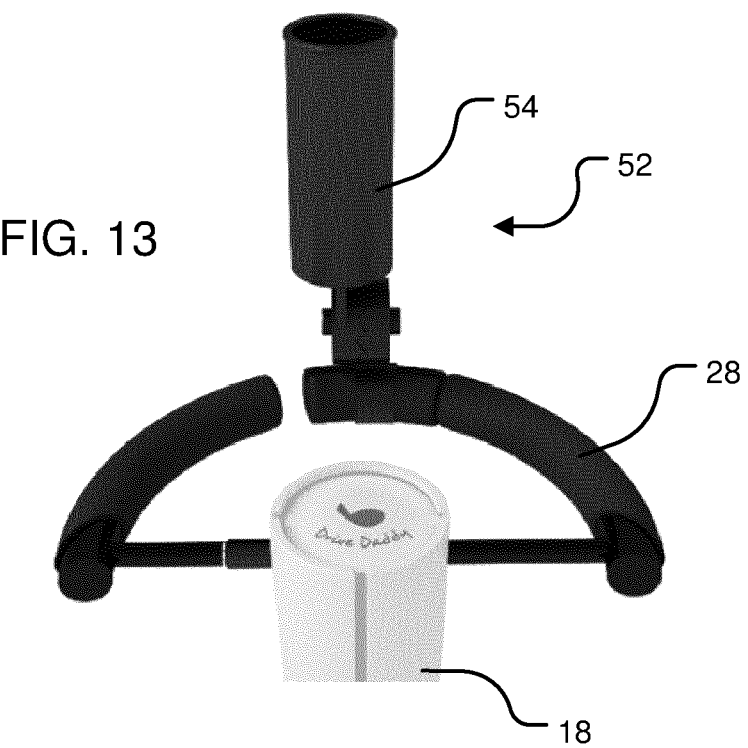
FIG. 13 is a top view of an object holder coupled to a handle bar arrangement.
Figure 14:
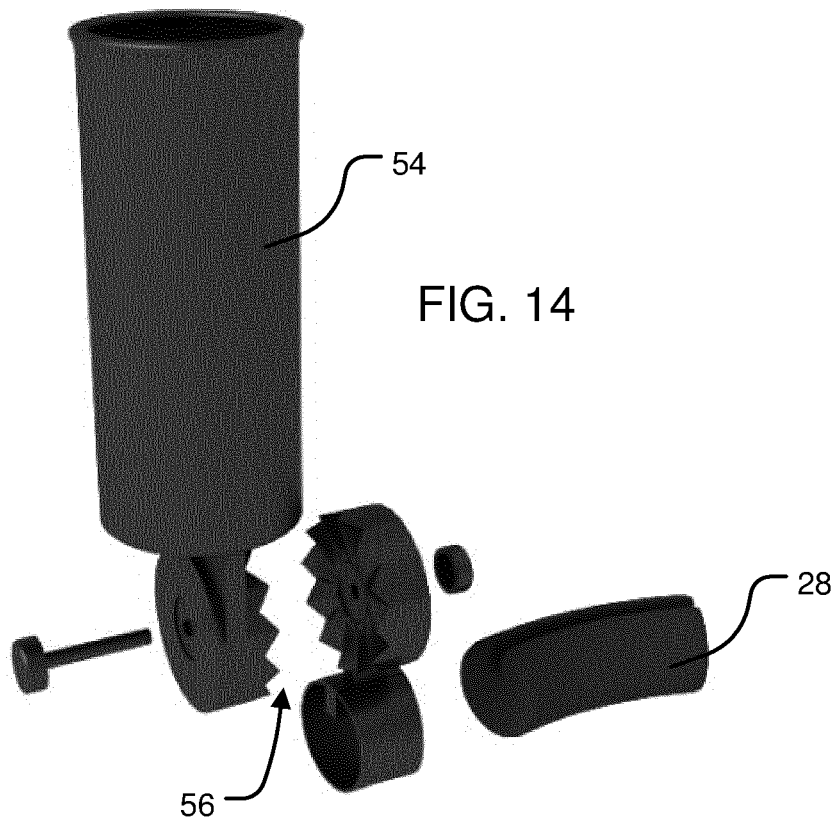
FIG. 14 is an exploded perspective view of the object holder in FIG. 13.

The vehicle 10 also comprises a motor assembly 22 for driving the rear wheels 14 (and/or the front wheel(s) 21), a power pack 23 for powering the motor assembly 22, and a control mechanism 26 mounted to (or adjacent to) a set of handlebars 28 (embodiments of which are shown in FIGS. 5 and 13) at one end of the control arm.

Figure 4:
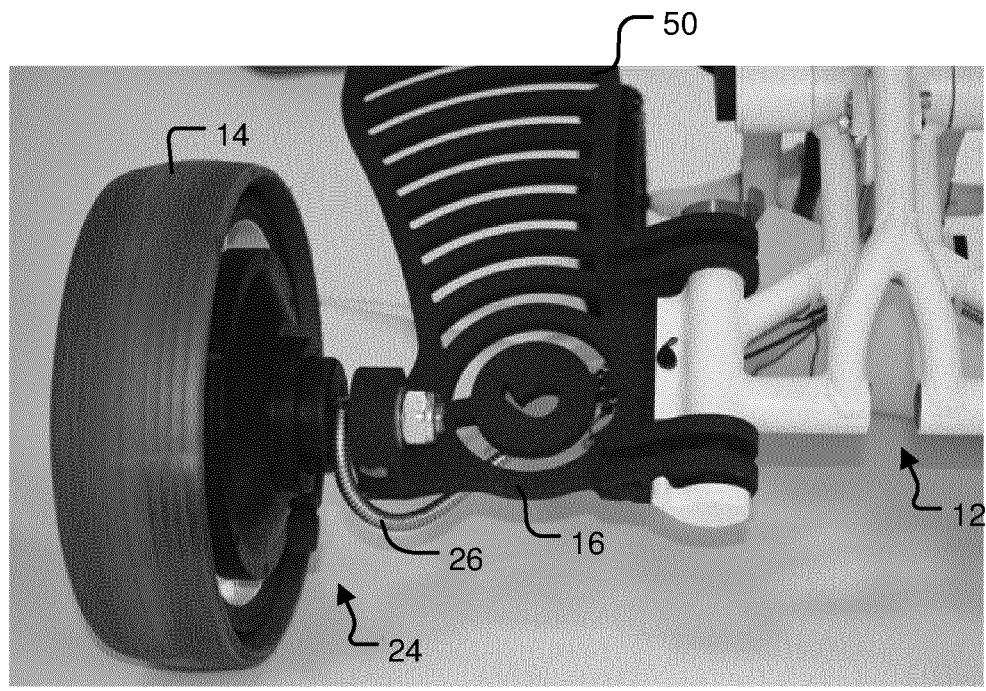
FIG. 4 is a perspective view of part of the rear of the vehicle shown in FIG. 1.

Now referring to FIG. 4, in one envisaged arrangement the electric motor assembly 22 comprises two electric hub motors 24 one of which is located within each of the rear wheels 14. The aforementioned power pack 23 can be coupled to the base part and electrically coupled to the motor assembly 22, or in another envisaged arrangement the power pack could be stored within a golf bag (or other container) mounted to the vehicle 10.

Figure 2:
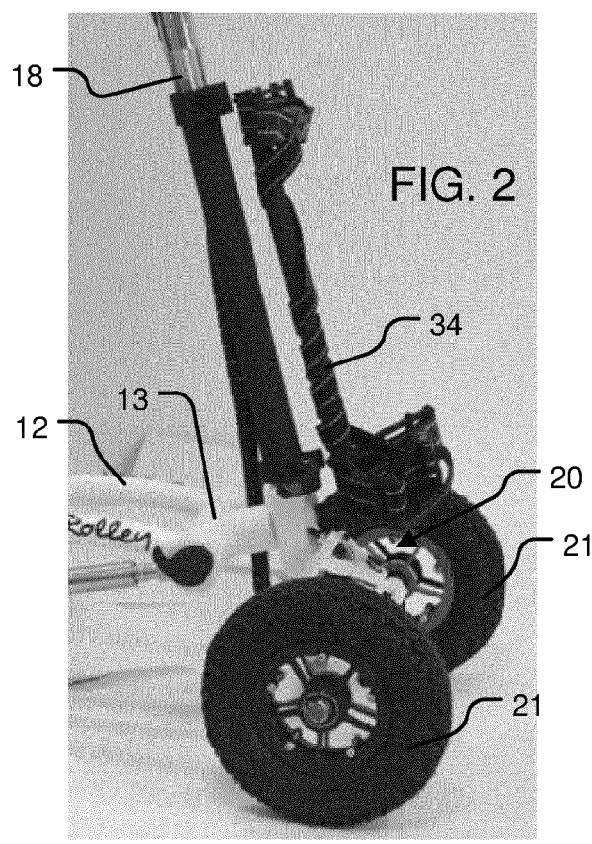
FIGS. 2 and 3 are magnified perspective views of the front end of the vehicle shown in FIG. 1.
Figure 3:
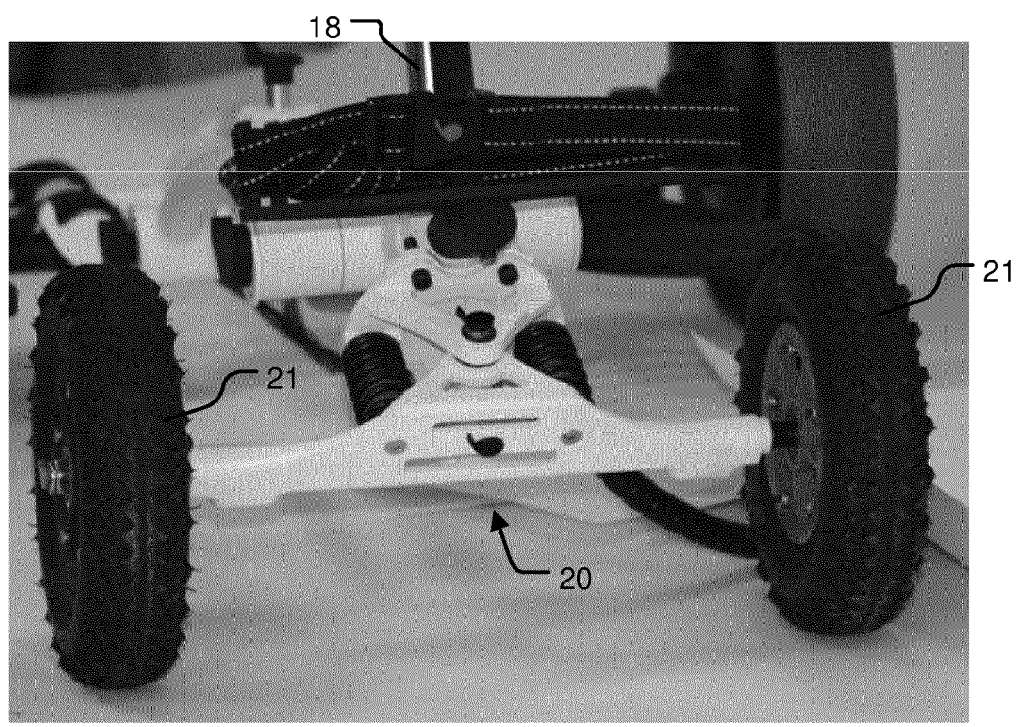

With reference to FIGS. 2 and 3, when the vehicle 10 is in motion a user is able to control the vehicle's direction by tilting the control arm 18. In particular the control arm 18 is configured to by tilted about the aforementioned rotatable connection between the front connector 20 and the pivot connector 13. Such tilting transfers a force via the front connector 20 to the front wheels 21, thereby allowing their orientation to be manipulated. Furthermore, the front and/or rear wheels 21, 14 may be braked by a disc-brake mechanism (a control 30 for which is mounted on the handlebars 28, see FIG. 5). Alternatively however, the front and/or rear wheels 21, 14 may be braked using a regenerative braking mechanism (for example incorporated into the aforementioned hub motors).

In this implementation it is also envisaged that the resistance to motion provided by the braking mechanism may be adjusted so as to vary the degree of effort required to push the vehicle when it is configured as a trolley. Furthermore, the control mechanism 26 may also include a throttle 32 for controlling the speed of the motor.

One envisaged motor assembly 22 comprises a 500 W brushless DC motor (which in tests is easily sufficient for powering a vehicle carrying a user of 130 kg), and the power pack 23 comprises a battery pack, for example a lithium ion battery pack. However, other types of motor and power pack may be provided if desired.

Referring back to FIG. 1, the vehicle 10 is also provided with a mounting member 34 configured to carry one or more upper connectors 36 (such as a strap or clip). The mounting member 34 may in addition (or instead) be provided with a lower connector 38 which defines a supporting surface. In use, the or each connector 36, 38 may be used to support a load such as a standard golf club bag (not shown) to be coupled to the vehicle 10 for transportation. More specifically (with particular reference to FIG. 2) the mounting member 34 is coupled to the pivot connector 13 via a coupling (not shown) which extends through an opening in the front connector 20. This provides that the control arm 18 can be titled by a user (and the front connector 20 rotated relative to the base part 12) without titling the mounting member 34 and therefore a load in contact therewith. This is advantageous because if a load being transported by the vehicle 10 was caused to tilt it could offset the balance of the vehicle 10 thereby causing the vehicle to topple over which could cause injury.

Figure 6:
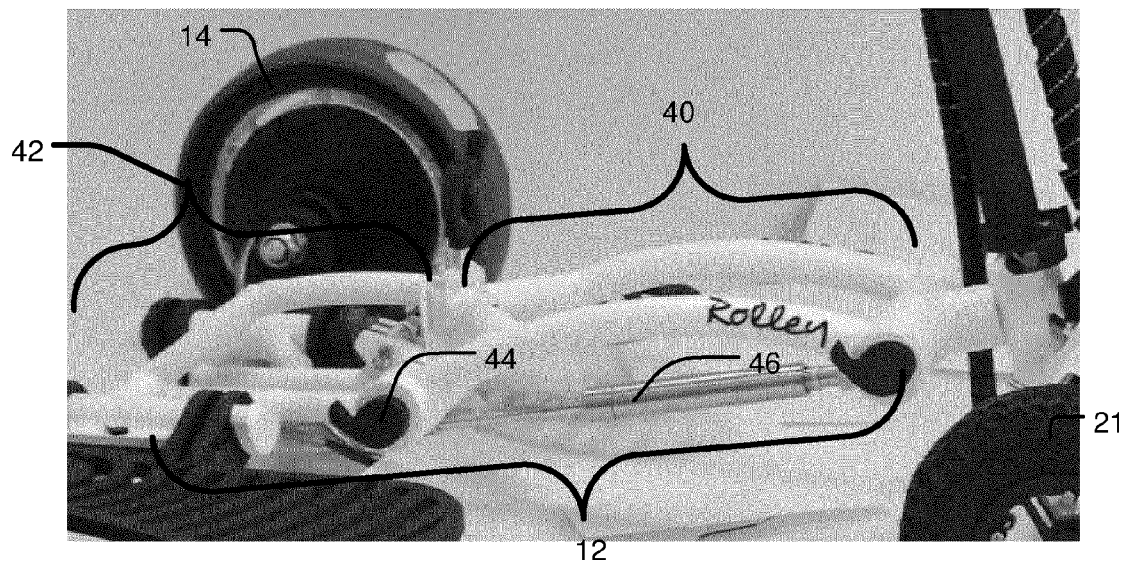
FIG. 6 is a magnified perspective view of part of the vehicle shown in FIG. 1.

More specifically (with further reference to the base part 12 and with particular reference to FIG. 6) the base part 12 comprises a plurality of base part members that are pivotally coupled to one another. In particular, in one arrangement the base part 12 comprises first and second base part members 40, 42 that are pivotally coupled to one another about a pivot 44. Furthermore, in such an arrangement the first and second base part members 40, 42 are also coupled together by biasing means such as a gas strut 46. In particular, such a gas strut 46 is pivotally coupled to each of the first and second base part members 40, 42. This arrangement allows the vehicle 10 to be reconfigured between a first configuration shown in FIGS. 1 and 6 (in which the first and second base part members 40, 42 are generally linearly aligned) and a second configuration shown in FIG. 7 (in which the first and second base part members 40, 42 are generally perpendicular or at a reduced angle relative to one another than when they were in the first configuration).

The first and second base part members 40, 42 are configured to be moved from the aforementioned first position (shown in FIGS. 1 and 6) to the aforementioned second position (shown in FIG. 7) by applying brakes to the rear wheels 14 (or the front wheels 21) and moving the front wheels 21 (or the rear wheels 14 as the case may be) towards the restricted wheel set using a motor for example. Alternatively however the front and rear wheels 21, 14 may be moved towards one another manually by a user upon applying brakes to the rear wheels 14 (or restricting their movement by placing a foot on the base part 12 or a rear connector 16), titling the control arm 18 towards the rear wheels 14 (by pivoting the pivot connector 13 relative to the first base part 40) and pulling the control arm 18 towards the rear wheels 21.

In particular, moving the front and rear wheels 21, 14 together causes the gas strut 46 to apply a resistive force to the first and second base members 40, 42 which causes them to pivot about the pivotal coupling 44 as the wheels are drawn together, thereby raising the pivot 44 away from the ground as the front 21 and rear wheels 14 are moved closer together.

Figure 7:
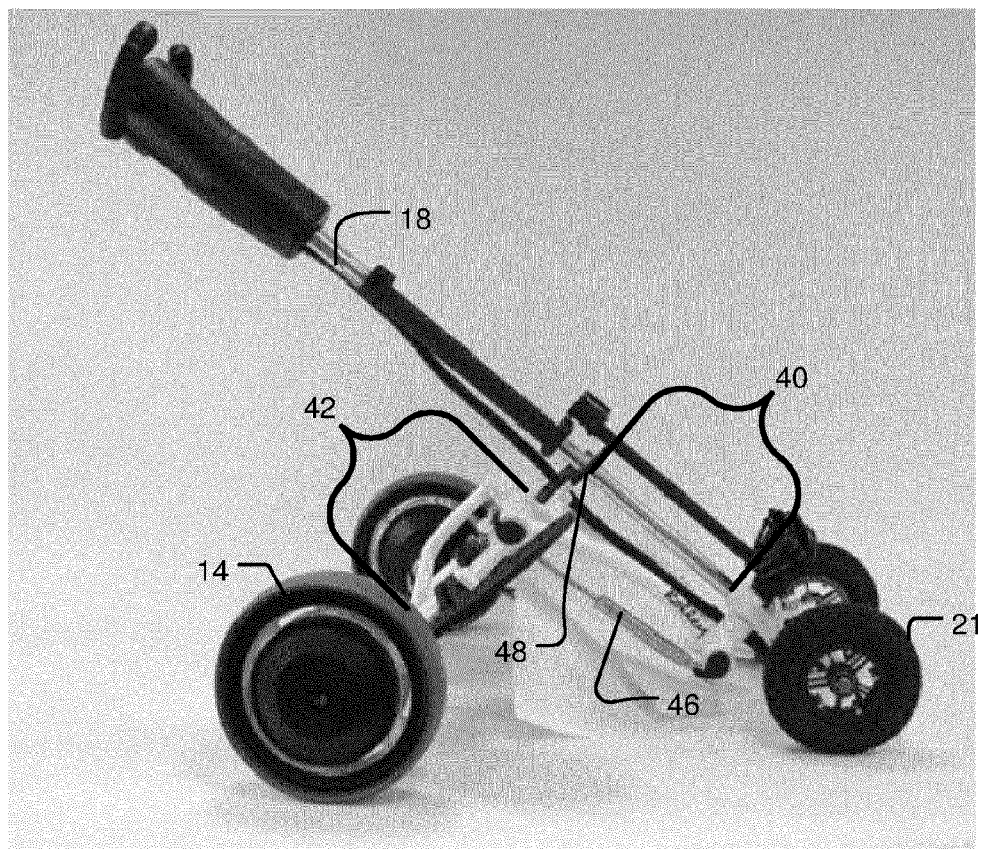
FIG. 7 is a side perspective view of the vehicle in FIG. 1 after having been rearranged into a second operating configuration.
Figure 8:
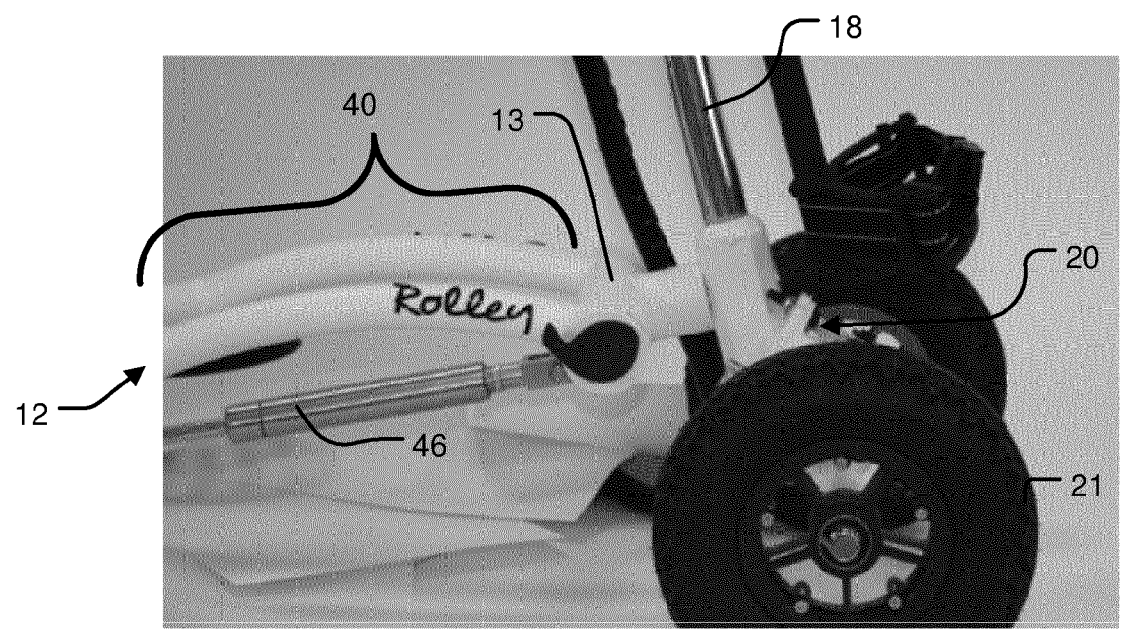
FIG. 8 is a magnified view of part of the front of the vehicle shown in FIG. 1.

Irrespective of the way that the first and second base part connectors 40, 42 are caused to move into the second position from the first position, in order to completely reconfigure the vehicle 10 from the first configuration (shown in FIG. 1) into the second configuration (shown in FIG. 7) the control arm 18 should be moved relative to the first base part component 40 from a first position (shown in FIG. 1) to a second position (shown in FIG. 7). In particular, the control arm 18 is to be moved from a first position in which it is generally perpendicular to the first base part connector 40 to a second position in which such components are generally linearly aligned. Furthermore, when the vehicle 10 is in the second configuration the control arm 18 may be retained in the second position by engaging it with a retaining member 48 (see FIGS. 1 and 7) such as a hook or clip. When in this configuration the gas strut 46 and retaining member 48 act to hold the vehicle in the second configuration shown in FIG. 7.

In use, when the vehicle is in the first operating configuration (see FIG. 1) the vehicle can be ridden by a user by standing on a pair of foot plates 50 (see FIG. 4) coupled to (or comprising part of) the rear connectors 16 and grasping the handle bars 28. In particular, in such a configuration the vehicle 10 is usable as a self-propelled ride-on quad (or trike if it only has a single front wheel 21). Although importantly, a user will still be required to stand in order to use the vehicle 10 and thus they will still be exercising to a greater extent than they would be were they to be seated in a golf cart.

However, when the vehicle 10 is in the second operating configuration (see FIG. 7) the vehicle assumes a shape more akin to that of a conventional golf trolley, and the user can operate the vehicle to move the vehicle (and their golf bag for example) whilst walking alongside the vehicle. As aforementioned, in one arrangement resistance to motion of the wheels of the vehicle can be adjusted so as to increase or reduce the difficulty with which the vehicle is able to be pushed or pulled. This allows a user to adjust the amount of exercise they experience by simply manipulating the vehicle around (for example around a golf course). Alternatively however, the vehicle may be motor driven such that a user neither has to pull nor push on the vehicle to move it.

Furthermore, the vehicle is also reconfigurable between the second configuration and a storage configuration (in which it occupies less space than when in either the first or second configuration). In particular, the first and second base part members 40, 42 are able to be further pivoted towards one another against the bias of the gas strut 46 thereby compressing the gas strut. This operation may be performed under the influence of a motor whereby either the front or the rear wheels 21, 14 are locked so that the unlocked wheels may be moved towards the locked wheels. In another envisaged arrangement however (as may also be the case when the vehicle is moved between the aforementioned first and second configurations) the front and rear wheels 21, 14 may be driven by a motor in opposing directions thereby causing them to move towards one another. Alternatively the first and second base part components 40, 42 may be pivoted manually by a user towards each other against the bias of the gas strut 46.

The first and second base part members and the gas strut mechanism co-operate to form an over-centre mechanism that causes the gas strut to be compressed when the vehicle is moved from the second configuration to the storage configuration. An illustration of one embodiment of a vehicle in such a configuration is shown in FIG. 9.

Figure 9:
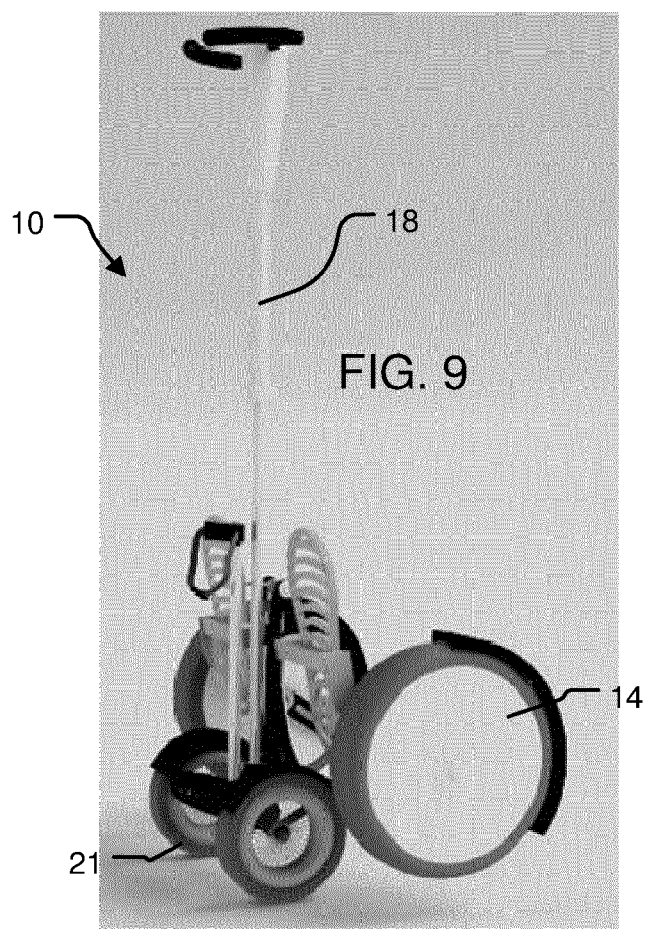
FIG. 9 is a perspective view of a vehicle after having been partially rearranged into a storage configuration.
Figure 10:
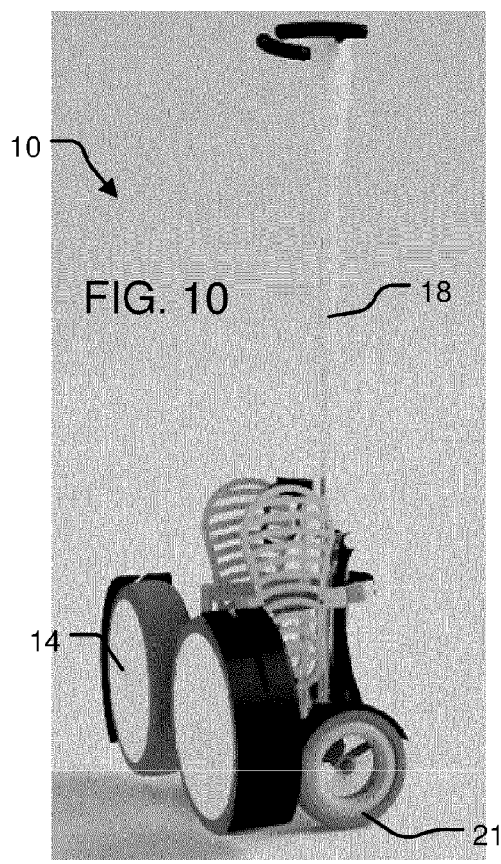
FIG. 10 is a perspective view of the vehicle in FIG. 1 after having been fully rearranged into a storage configuration.
Figure 11:
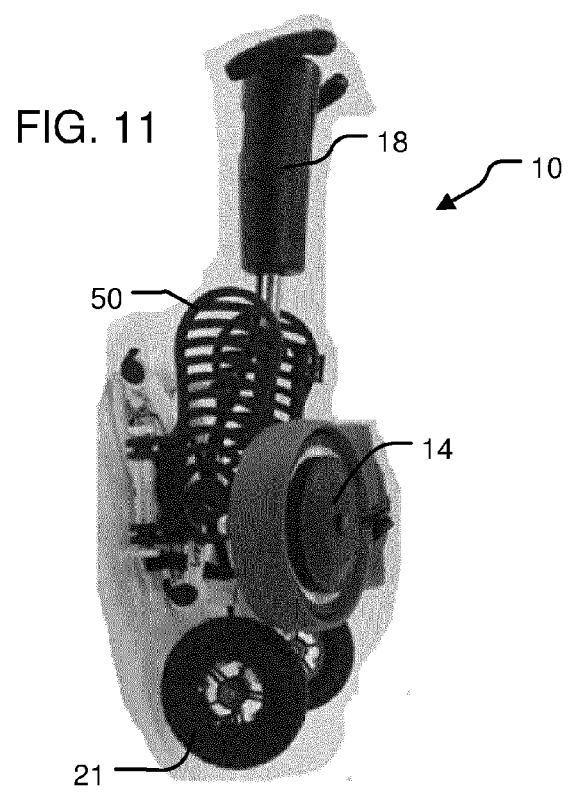
FIG. 11 is a perspective view of the vehicle shown in FIGS. 1 and 7 after having been rearranged into a storage configuration.

When in the configuration shown in FIG. 9 the vehicle 10 has only been partially moved into the storage configuration. Therefore, in order to further reduce the vehicle in size and move it fully into the storage configuration, the rear wheels 14 are pivoted from a position in which they are generally axially aligned (see FIG. 9) to a position in which the axes about which the rear wheels 14 rotate are generally parallel (see FIG. 10). Such a pivotal rearrangement of the rear wheels 14 is enabled because the rear connectors 16 to which the rear wheels 14 are coupled are themselves pivotally coupled to the base part 12 (see FIG. 4). In particular, protrusions extending from the base part 12 extend through openings defined by the rear connectors 16 (or vice versa), thereby pivotally coupling the rear connectors to the base part 12.

Figure 12:
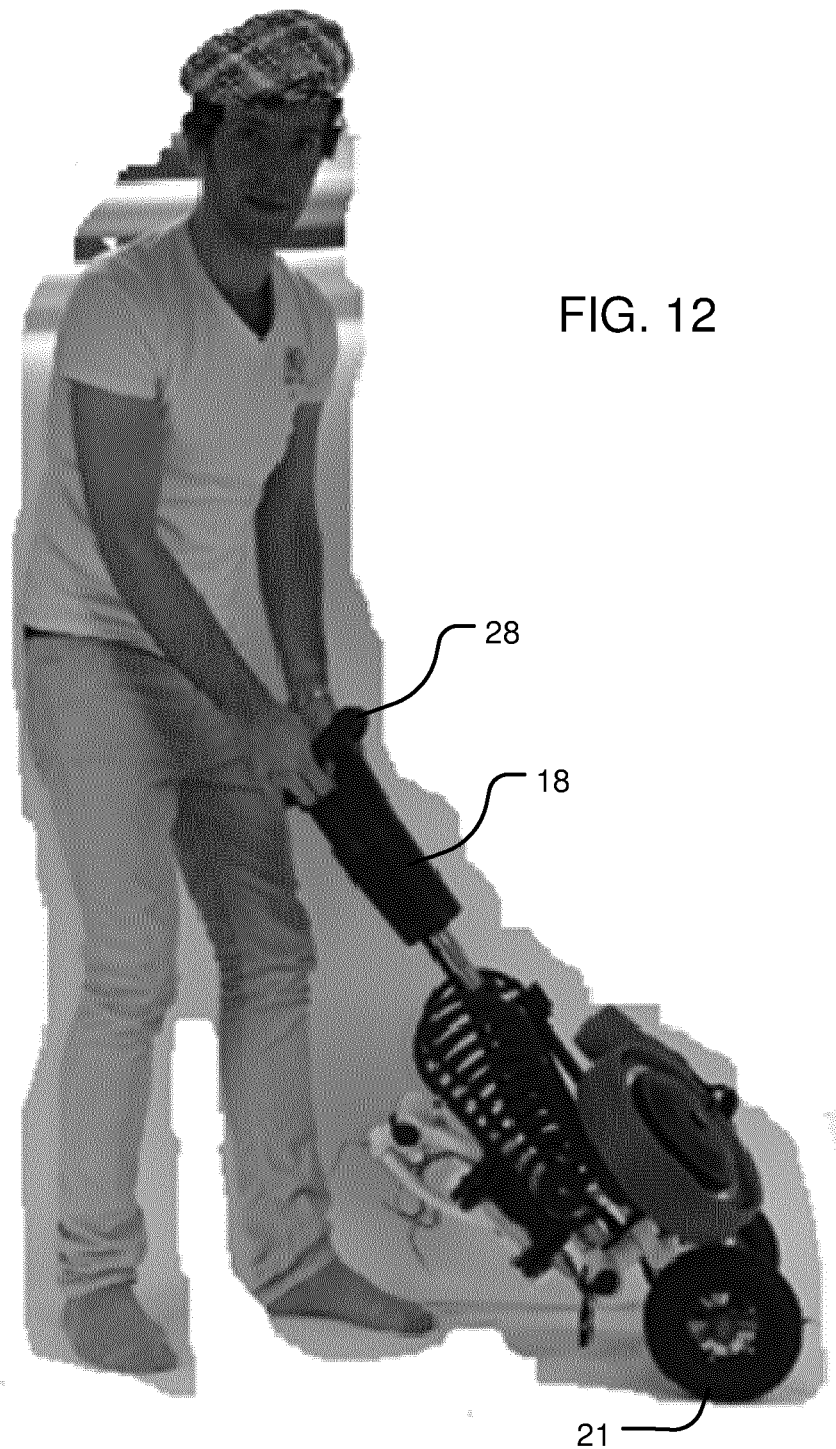
FIG. 12 is a perspective view of the vehicle in FIG. 11 being transported while in the storage configuration.

In the storage configuration (see FIGS. 10 and 11) the vehicle 10 is able to be drawn along the ground on the front wheels 21 by pulling the control handle 18 (or handle bars 28) in a similar manner to a travel suitcase (see FIG. 12). The advantage is thereby provided of increasing the ease with which the vehicle 10 may be transported when not in use.

As will be appreciated, the vehicle 10 is able to be interchangeably reconfigured between the first, second and storage configurations (shown in FIGS. 1, 7 and 11) depending on whether (or how) a user intends to use the vehicle 10.

Lastly, it is also envisaged that various attachments may be coupled to the vehicle 10 in order to further customise the vehicle 10 to a particular user's needs. For example, if it is raining a user may be required to carry an umbrella. In such circumstances (with reference to FIG. 13) by coupling an object holder 52 to the vehicle (for example to the handle bars 28) a user is able to use the object holder 52 to hold onto an object (such as an umbrella). In the particular example shown in FIG. 13, the object holder 52 comprises a hollow (for example, cylindrical) body 54 into which the shaft of an umbrella (not shown) may be inserted. Furthermore, the angle of the body 54 relative to the handle bars 28 is able to be adjusted by changing the configuration of the inter-engaging teeth 56 comprising part of the object holder 52. It also envisaged that other attachments (instead of or in addition to an umbrella) may be coupled to the vehicle 10 using one or more of the same (or different types of) object holders 52 or object couplings.

Figure 17:
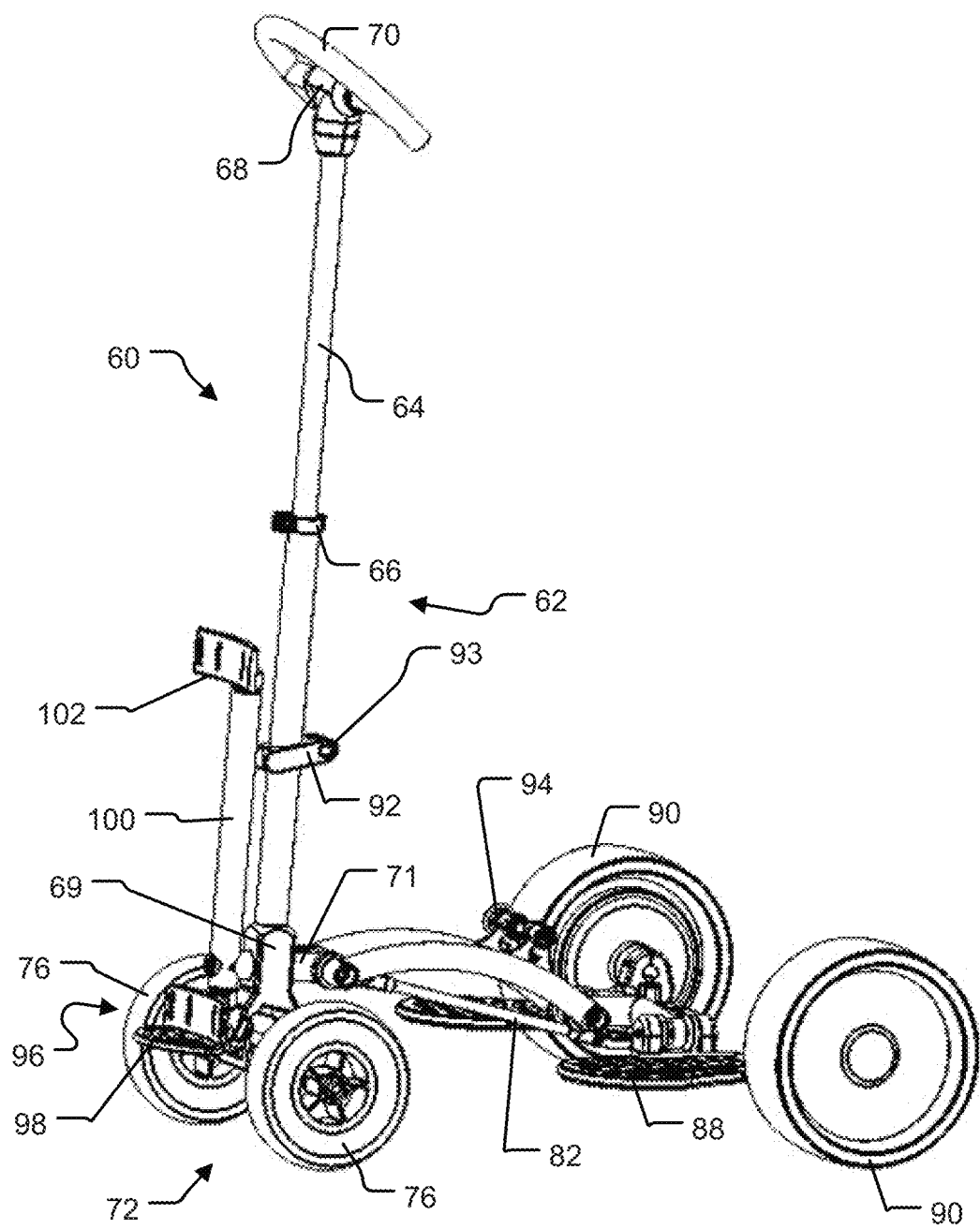
FIG. 17 is an isometric view of a vehicle according to a second embodiment of the present invention, the vehicle being in a first configuration.
Figure 18A:
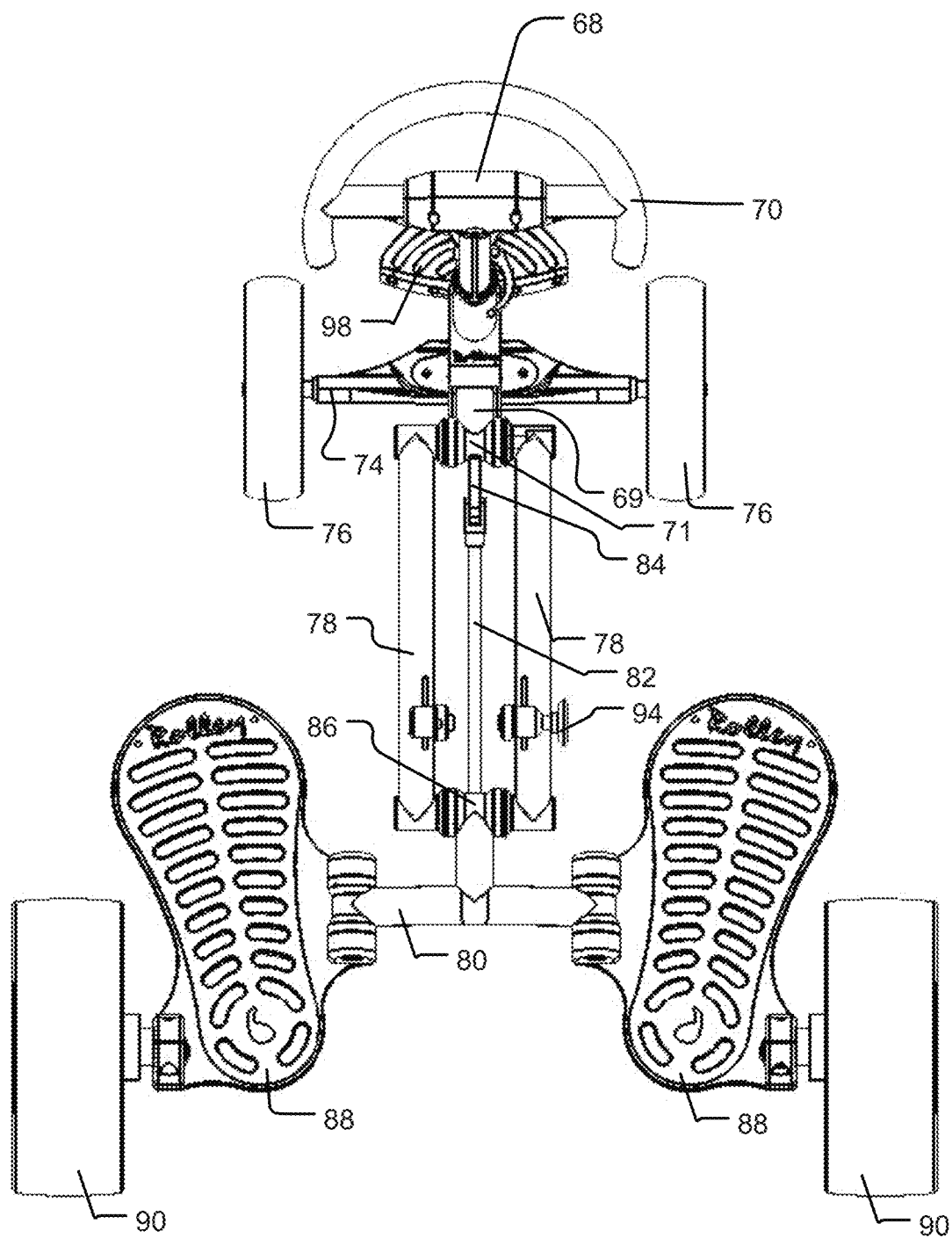
FIGS. 18a and 18b are top and underneath plan views, respectively, of the vehicle shown in FIG. 17.
Figure 18B:
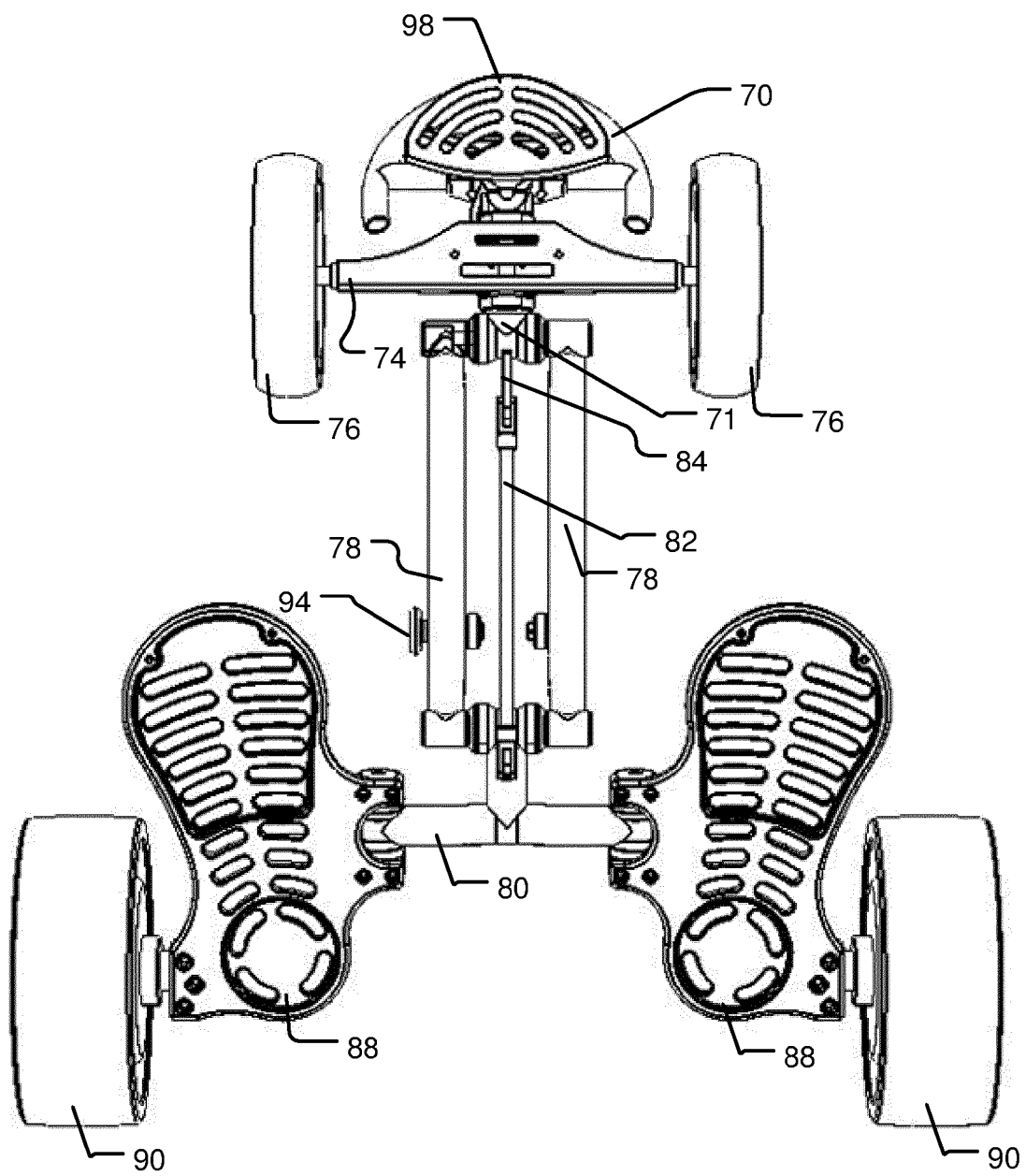

Referring now to FIGS. 17, 18a and 18b, there is depicted a vehicle 60 according to a second embodiment of the present invention.

The vehicle 60 comprises a steering arm assembly 62 which comprises a telescopic arm 64 that is shown in FIG. 17 as being locked in its extended position by locking clamp 66. One end of the telescopic arm 64 is provided with a head 68 to which a generally semi-circular control handle 70 is pivotally attached. In a preferred implementation, a user can pivot the control handle 70 relative to the arm head 68 to cause the vehicle motors to be energised.

The other end of the telescopic arm 64 is coupled to an arm bracket 69 that is pivotally attached to a front bracket 71 and to a front wheel assembly 72. The front wheel assembly 72 comprises a front axle 74 to either end of which a respective front wheel 76 is rotationally (and optionally removably) attached. The arm and arm bracket are coupled to the front wheel assembly 72 and front bracket 71 in such a way that the arm and bracket can rotate around the front bracket 71 and be tilted towards one or other of the front wheels 76 to steer the vehicle 60.

The front bracket 71 is also pivotally attached to one end of a pair of curved chassis arms 78, and the other end of the chassis arms 78 are pivotally attached to a first arm of a generally T-shaped rear bracket 80. A control rod 82 is pivotally coupled at one end to a tab 84 that projects from the front bracket 71 generally towards the rear bracket 80, and is pivotally coupled at its other end to a rear bracket tab 86 that projects generally downwardly from the plane of the three arms that form the T-shaped rear bracket 80. As will be appreciated by persons skilled in the art, the front bracket tab 84 comprises a first arm of a so-called four-bar-linkage, the chassis arms 78 comprise a second arm of the linkage, the rear bracket tab 86 comprises the third arm of the linkage, and the control rod 82 comprises the fourth arm of that linkage.

Referring now to FIGS. 18a and 18b, the arms of the aforementioned T-shaped rear bracket 80 that are not coupled to the chassis arms 78 are each pivotally coupled to a footplate 88. An in-wheel motor assembly 90 is rotationally coupled to each said footplate 88 so that the wheel rotates in a plane that is (at least generally) perpendicular to the plane of the footplate to which it is attached. The wheel assemblies may, in one envisaged arrangement, be detachable from the footplates 88.

Figure 23:
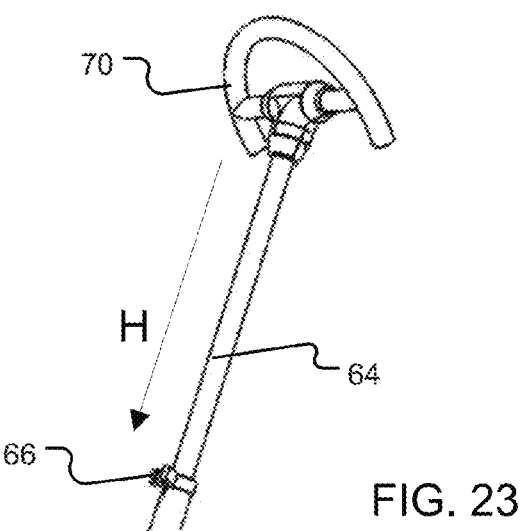
FIG. 23 is a schematic representation of the vehicle in the third configuration.
Figure 24:
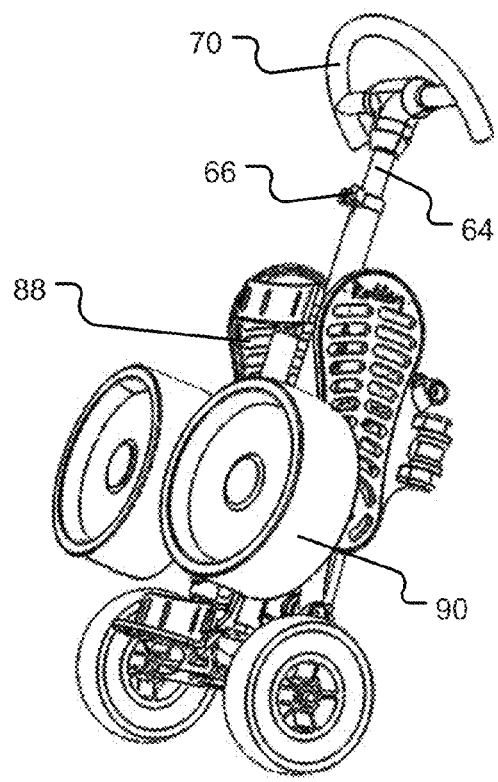
FIG. 24 is a schematic representation of the vehicle in a fourth configuration.

In a preferred arrangement, the pivotal couplings between the T-shaped bracket and the footplates may each be provided with a sprung locking pin (not shown in the drawings) that is operable to lock the footplates in an orientation where the plates are generally parallel to a plane formed by the arms of the T-shaped bracket (as shown in FIG. 17, as well as in an orientation where the plane of each footplate is generally perpendicular to the plane of the T-shaped bracket (as shown in FIGS. 23 and 24).

Referring now to FIGS. 17 and 18a, a lower part of arm 64 is provided with a lock block 92 that is configured to co-operate (in a manner that is later described) with a sprung locking pin assembly 94 mounted on the chassis arms 78 to lock the vehicle in a predetermined operating configuration. The lock block includes a keep 93 (for example in the form of a hole or depression) that is distal from the arm 64 and sized to accommodate the pin of the locking pin assembly 94.

The vehicle is also provided with a bag holder 96 that comprises a lower support plate 98 which is mounted to a tube 100 that is coupled to the front bracket 71 so that the tube does not tilt with the steering arm assembly 62. The bag holder further comprises an upper support 102 mounted on the tube, and straps (not shown) may be threaded through the upper and lower supports 98, 102 to secure a bag (such as a golf bag) to the bag holder 96.

As with the previous embodiment, the vehicle comprises an appropriate control module (the like of which is well known in the art) that is configured to control the supply of power from a power supply (such as a battery pack) to the in-wheel motor assemblies as the control handle 70 is manipulated by a user.

The manner in which the vehicle can be reconfigured between different operating modes will now be described with reference to FIGS. 19 to 24.

FIG. 19 shows the vehicle in a "ride on" configuration where a user can stand on the footplates 88, and drive the vehicle around by moving the control handle 70 and steering arm assembly 62. By pulling the arm 64 in direction A (i.e. towards the in-wheel motor assemblies 90) the T-shape rear bracket 80 pivots relative to the chassis arms 78 to cause the footplates 88 to move to a position where they are inclined towards the arm 64 of the steering arm assembly 62. The user can then engage the locking pin of the locking pin assembly 94 with the keep in the lock block 92 to lock the vehicle in the configuration shown in FIG. 20, and in this configuration the vehicle functions as a powered trolley on a which a bag (for example, a golf bag) may be supported in the aforementioned bag holder 96.

Figure 21:
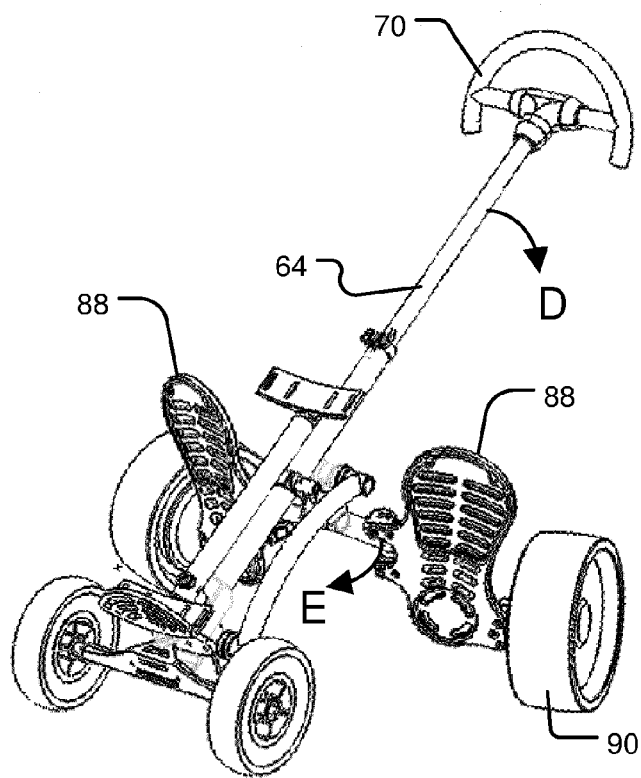
FIGS. 21 and 22 are schematic representations of the vehicle as it is moved from the second configuration towards a third configuration.

If the user disengages the locking pin from the keep, the user can move the arm in direction B (i.e. further towards the in-wheel motor assemblies 90) whereupon the T-shaped bracket will pivot in direction C further towards the front wheel assembly 72 as the locking pin slides up the lock block towards the arm 64. The vehicle is configured so that the locking pin continues to slide (and the T-shaped bracket continues to pivot) until the locking pin reaches a point where it is generally adjacent the arm 64 and the foot plates are generally vertically orientated (as shown in FIG. 21).

Figure 22:
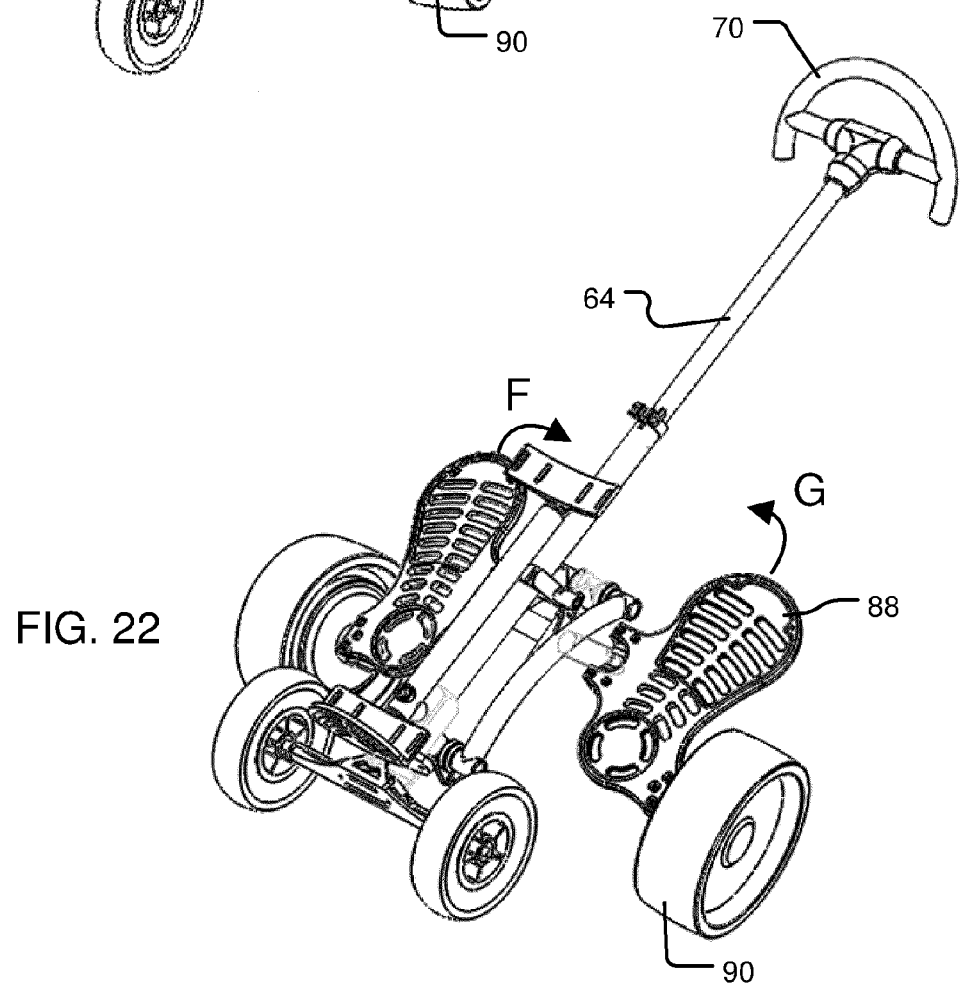

Continued movement of the arm 64 in direction D causes the T-shaped bracket to pivot in direction E further towards the front wheel assembly 72 as the locking pin slides along the lock block away from the arm 64 towards the keep. As the locking pin continues to slide (and the T-shaped bracket continues to pivot) the footplates move progressively towards a point where they are generally inverted and the locking pin re-engages with the keep in the lock block 92 (as shown in FIG. 22).

In this configuration a bag supported by the bag support should be removed, following which the locking pins (not shown) that keep the footplates in generally the same plane as the T-shaped bracket can be released, and the footplates and attached in-wheel motor assemblies can be folded up towards the arm (in directions F and G) until the vehicle is in the configuration shown in FIG. 23. Once in this configuration, the locking clamp 66 on the telescopic arm 64 can be released, and the part of the arm on which the control handle 70 is carried can be telescoped into the remainder of the arm until the vehicle is in the configuration shown in FIG. 24.

Thus it has been shown that the vehicle disclosed above can readily be reconfigured between a ride-on configuration (where the vehicle can be used to transport a user and goods (such as a bag), a powered trolley configuration (where the vehicle can be used as a powered trolley for the transport of goods (such as a bag), and a collapsed storage configuration (shown in FIG. 24) where the footprint of the vehicle is much reduced for storage. Advantageously, the vehicle disclosed herein can be reconfigured between these different modes without having to disassemble the vehicle.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, in at least the aforementioned first embodiment, the rear wheels 14 may be configured to moved translationally relative to the first base part member 40. In one particular envisaged arrangement the rear wheels 14 may be slidably coupled to the first base part member 40. More specifically, the rear connectors 16 (to which the wheels 14 are coupled) may be configured to slide relative to the first base part member 40. This allows the length of the vehicle 10 to be adjusted while it is in the first (rideable) configuration (shown in FIG. 1) so as to be suited more appropriately to a particular user's size or preference. Furthermore, moving (for example by sliding) the wheels 14 relative to the first base part member 40 also allows the vehicle 10 to be reduced in size for storage.

Furthermore, in one envisaged arrangement the rear connectors 16 may be coupled to one another, alternatively however they may comprise a single element and may define or house a rear wheel axle.

It should also be noted that whilst the accompanying claims set out particular combinations of features described herein, the scope of the present invention is not limited to the particular combinations hereafter claimed, but instead extends to encompass any combination of features herein disclosed.

The invention claimed is:

1. A self-propelled vehicle suitable for use as a golfing accessory, the vehicle comprising:
 a base part comprising first and second base part members that are pivotally coupled to one another by a mechanical linkage;
 a control arm, said control arm and base part being moveable relative to one another so that said vehicle can be arranged without being disassembled in first and second different operating configurations, and a third storage configuration,
 a pair of wheels coupled to said second base part member, each wheel of said pair being pivotable relative to said second base part member, and at least one wheel coupled to said first base part member;
 wherein in a first of said operating configurations the vehicle is configured to allow a user to ride on the vehicle and in a second of said operating configurations the vehicle is configured for use as a trolley for supporting a golf bag, and in said storage configuration the vehicle is collapsed for compact storage and each wheel of said pair has been pivoted relative to the base part; and
  wherein: i) an axis about which said at least one wheel coupled to the first base part member rotates when said vehicle is in said first or second operating configurations defines a first axis; ii) an axis about which said pair of wheels coupled to the second base part member rotate when said vehicle is in said first or second operating configurations defines a second axis; iii) an axis about which the second base part member pivots relative to the mechanical linkage defines a third axis; iv) when the device is in the first and second configurations the third axis is located between the first and second axes; and v) when the vehicle is moved towards the storage configuration from said second operating configuration the second axis moves away from the control arm and towards the first axis until the second axis is located between the first and third axes, whereupon said pair of wheels may each be pivoted relative to said second base part member out of alignment with said second axis until said pair of wheels lie adjacent one another to thereby place said vehicle in said storage configuration.

2. A vehicle according to claim 1, wherein the first and second base part members are generally linearly aligned when the vehicle is in the first configuration.

3. A vehicle according to claim 1, wherein the first and second base part members are generally perpendicular to one another when the vehicle is in the second configuration.

4. A vehicle according to claim 1, comprising a motor for driving one or more of the wheels.

5. A device for transporting golf dubs, the device comprising:
- a first part provided with at least one wheel;
- a second part provided with a pair of wheels; said second part being pivotally coupled to said first part by a mechanical linkage, each of said pair of wheels being pivotally coupled to said second part, and
- a third part for manipulation by a user when the device is in use;
- wherein the device is reconfigurable between first, second and third configurations without disassembly, and is configured such that:
  i) in said first configuration of the device the first; second and third parts occupy a first position relative to one another so that the device can be operated as a personal transport vehicle for transporting at least a user;
  ii) in said second configuration of the device the first, second and third parts occupy a second position relative to one another so that the device may be operated as a trolley for transporting golf clubs, and
  iii) in said third configuration of the device the first, second and third parts occupy a third position whereby the device is collapsed for storage, said device having a footprint in said third configuration that is smaller than a foot print of the device in either of the first and second configurations; and
- wherein: a) an axis about which said at least one wheel coupled to the first part rotates when said vehicle is in said first or second operating configurations defines a first axis; b) an axis about which said pair of wheels coupled to the second part rotate when said vehicle is in said first or second operating configurations defines a second axis; c) an axis about which the second part pivots relative to the mechanical linkage defines a third axis; d) when the device is in the first and second configurations the third axis is located between the first and second axes; and e) when the vehicle is moved towards the third configuration from said second configuration the second axis moves away from the third part and towards the first axis until the second axis is located between the first and third axes, whereupon each of said pair of wheels may be pivoted relative to said second part out of alignment with said second axis until said pair of wheels lie adjacent one another to thereby place said vehicle in said third configuration.

6. The device of claim 5, wherein the device is configured such that: i) when the device is being operated as a personal transport device the third part is at a first angle relative to the ground; and ii) when the device is being operated as a golf trolley the third part is at a second angle relative to the ground, said second angle being smaller than said first angle.

7. The device of claim 5, wherein the mechanical linkage comprises a four-bar linkage.

8. The device of claim 5, wherein the device is configured such that a distance between i) the at least one wheel provided on said first part and ii) the pair of wheels provided on said second part, is greater when the device is being operated as a personal transport vehicle than when the device is being operated as a golf trolley.

9. The device of claim 5, wherein the first part is provided with a support for supporting a golf bag.

10. The device of claim 9, wherein the device is configured such that: i) the third part is moveable relative to the support when the device is being operated as a personal transport device; and ii) the third part is fixed relative to the support when the device is being operated as a golf trolley.

* * * * *